US005241319A

United States Patent [19]

Shimizu

[11] Patent Number: 5,241,319

[45] Date of Patent: Aug. 31, 1993

[54] ANTENNA BEAM POINTING METHOD FOR SATELLITE MOBILE COMMUNICATIONS SYSTEM

[75] Inventor: Ryuji Shimizu, Tokyo, Japan

[73] Assignee: NEC Corporation, Japan

[21] Appl. No.: 687,729

[22] Filed: Apr. 19, 1991

[30] Foreign Application Priority Data

Apr. 19, 1990 [JP] Japan ................................ 2-103411

[51] Int. Cl.[5] ........................ H04B 7/185; H01Q 3/00; G01S 13/00

[52] U.S. Cl. .................................... 342/358; 342/359; 342/77

[58] Field of Search ............... 342/352, 357, 358, 359, 342/77, 76, 75

[56] References Cited

U.S. PATENT DOCUMENTS

| | | | |
|---|---|---|---|
| 4,084,159 | 4/1978 | Anderson et al. | 342/77 |
| 4,459,667 | 7/1984 | Takeuchi | 342/457 |
| 4,590,476 | 5/1986 | Burkett | 342/400 |
| 4,752,843 | 2/1988 | Suzuki et al. | 342/359 |
| 5,030,958 | 7/1991 | Schmalenberger et al. | 342/358 |

*Primary Examiner*—Gregory C. Issing
*Attorney, Agent, or Firm*—Laff, Whitesel, Conte & Saret

[57] ABSTRACT

A method for tracking a satellite in a land mobile satellite communications system is disclosed. A rate gyro is provided for use in the event that an automatic satellite tracking is prevented. The satellite is automatically tracked using a receive signal level if the receive signal level equals or exceeds a threshold. An output of the rate gyro is constantly compensated while automatically tracking the satellite. When the receive signal level falls below the threshold and the automatic satellite tracking becomes unable, the satellite is tracked using the compensated output of the rate gyro.

3 Claims, 4 Drawing Sheets

ANTENNA BEAM POINTING METHOD FOR SATELLITE MOBILE COMMUNICATIONS SYSTEM

BACKGROUND OF THE INVENTION

1. Field of the Invention

The present invention relates generally to a method for antenna beam pointing or orientation in a satellite mobile communications system, and more specifically to such a method which constantly or intermittently compensates for an output of a rate gyro while automatically tracking the satellite, and obviates the need for a highly precise, expensive rate gyro and for a constant temperature chamber therefor (for example).

2. Description of the Prior Art

Before turning to the present invention it is deemed advantageous to discuss a known antenna beam pointing (stationary satellite tracking) technique with reference to FIGS. 1 to 4.

FIG. 1 is a sketch schematically illustrating a satellite mobile communications system wherein there is shown a stationary satellite 10 through which a plurality of automobiles 12, 14 and a ground station 16, are able to communicate with one other. As shown, the automobiles 12, 14 are respectively equipped with antennas 12', 14', while the earth station is provided with a parabola antenna 16'.

FIG. 2 illustrates a phased array type land mobile antenna system 18 which corresponds to each of the antennas 12' and 14' shown in FIG. 1. The antenna system 18 is comprised of a dielectric plate 20, which is mounted on a rotatable pedestal 22 and which carries four antenna elements 24*a*–24*d* in this case. Each of the antenna elements *22a–22d* is a spiral form microstrip line. The dielectric plate 20 and the rotatable pedestal 22 are covered by a radome 26. The arrangement shown in FIG. 2 is well known in the art.

FIG. 3 shows schematically a fan beam 28 formed by a phased array antenna 30 mounted on the roof of an automobile 32. This antenna features a construction of the nature shown in FIG. 2.

Merely by way of example, the fan beam 28 has a half power beam width of about 20° in azimuth (AZ) plane and about 80° in elevation plane. This, as will be understood, randers the tracking of the stationary satellite in elevation plane unnecessary.

FIG. 4 is a block diagram showing a known antenna beam orienting system, which includes a phased array antenna 40 of the nature shown in FIG. 2. Accordingly, the numerals 24*a*–24*d* of FIG. 2 are also used to denote like elements of the antenna 40.

The beam direction of the antenna 40 can be changed in two azimuths by switching four phase shifters 42*a*–42*d* in order to specify the antenna azimuth relative to the satellite position. The switching of the phase shifters 42*a*–42*d* is performed in accordance with a predetermined repetition frequency of a reference signal applied thereto from a reference oscillator 44 via a bias tee 46 and a rotary joint 48. The bias tee 46 is a unit which includes an inductor L and a capacitor C. The bias tee 46 steers the reference signal from the reference oscillator 44 toward the rotary joint 48, while directing an RF (Radio Frequency) signal from the rotary joint 48 to a transceiver 50. On the other hand, the rotary joint 48 establishes an electrical contact between a rotating cable attached to the rotatable antenna and the fixed cable coupled to the bias tee 46.

The transceiver 50 includes a diplexer 52, a modem 54, etc. Transceivers which are utilized in satellite communications system are well known in the art and hence the detailed description will be omitted for the sake of brevity. Although not shown in FIG. 4, the modem 54 includes a receive signal level detector which is supplied with an output of an AGC (Automatic Gain Control) amplifier provided in an IF (Intermediate Frequency) stage. A coherent detector 56 receives the above-mentioned receive signal level (RSL) and synchronously detect the antenna angular position error (APE) with the aid of the reference signal applied from the oscillator 44. The output of the coherent detector 56 (viz., the angular position error) is applied to a switch 58.

As shown, a rate gyro 60 is provided and outputs a signal indicative of the yaw rate of the vehicle around the azimuth axis thereof. The voltage output of the rate gyro 60 is applied to the switch 58.

A comparator 62 is supplied with the above-mentioned receive signal level (RSL) at one input of a comparator 62 and receives a threshold at the other input thereof. In the event that the receive signal level RSL is higher than the threshold, the output of comparator 62 (viz., switch control signal (SCS)) allows the switch 58 to apply the antenna angular position error (APE) derived from the coherent detector 56 to a voltage/frequency converter 64.

The voltage/frequency converter 64 converts the angular position error APS (voltage) into a corresponding pulse signal whose frequency is proportional to the error signal applied. In the event that the antenna should rotate in a clockwise direction, a control signal CW is applied to a stepper motor driver 66. A stepper motor 68 responds by rotating the pedestal 22 (FIG. 2) in a clockwise direction. Similarly, if the error signal APE indicates that the antenna 40 should rotate in a counterclockwise direction, then the stepper motor driver 66 receives a control signal CCW and controls the motor 68 in a direction opposite to the above case (viz., counterclockwise direction). This loop control continues until the antenna angular position error reaches a zero value.

On the other hand, in the event that the antenna mounted vehicle enters the shadow of a large building (for example) and the satellite tracking is prevented, then the receive signal level RSL falls below the threshold. In such a case, the switch 58 allows the output of the rate gyro 60 to be applied to the voltage/frequency converter 64. Accordingly, the stepper motor driver 66 controls the motor 68 using the output of the rate gyro 60.

In order to accomplish precise tracking control, the rate gyro 60 is required to exhibit extremely high precision irrespective of the ambient conditions. However, such high precision rate gyros are very expensive and are required to be enclosed within a constant temperature chamber in order to ensure their accuracy. Further, it is inherently difficult to reduce the size of a high precision rate gyro and the maintenance of the same is both awkward and time consuming.

SUMMARY OF THE INVENTION

It is therefore an object of the present invention to provide a method for constantly or intermittently compensating for the output of the rate gyro while automatically tracking the satellite.

In brief, the above object is achieved by a method for tracking a satellite in a land mobile satellite communications system. A rate gyro is provided for use in the event that an automatic satellite tracking is prevented. The satellite is automatically tracked using a receive signal level if the receive signal level equals or exceeds a threshold. An output of the rate gyro is constantly compensated while automatically tracking the satellite. When the receive signal level falls below the threshold and the automatic satellite tracking becomes unable, the satellite is tracked using the compensated output of the rate gyro.

More specifically a first aspect of the present invention is deemed to come in a method for tracking a satellite in a land mobile satellite communications system, a rate gyro being used in the event that an automatic satellite tracking is prevented, the method comprising the steps of: (a) automatically tracking the satellite using the receive signal level if the receive signal level equals or exceeds a threshold; (b) compensating for an output of the rate gyro while automatically tracking the satellite; and (c) tracking the satellite using the output of the rate gyro if the receive signal level falls below the threshold indicating that the automatic satellite tracking is unable.

A second aspect of the present invention is deemed to come in a method for tracking a satellite in a land mobile satellite communications system, a rate gyro being used in the event that an automatic satellite tracking is prevented, the method comprising the steps of: (a) automatically tracking the satellite using the receive signal level if the receive signal level equals or exceeds a threshold; (b) acquiring an output of a counter while automatically tracking the satellite, the output of the counter indicating an antenna angular position; (c) determining an antenna angular velocity using the output of the counter obtained at step (b); (d) setting a value of a first rate gyro output compensating factor to be equal to an angular velocity of an antenna mounted automobile if the antenna angular velocity is detected zero, the angular velocity of the automobile being derived from the rate gyro, the first rate gyro output compensating factor previously being set to a predetermined value; and (e) determining a value of a second rate gyro output compensating factor using the antenna angular velocity, the automobile angular velocity and the first compensating factor, the second rate gyro output compensating factor previously being set to a predetermined value.

BRIEF DESCRIPTION OF THE DRAWINGS

The features and advantages of the present invention will become more clearly appreciated from the following description taken in conjunction with the accompanying drawings in which.

DETAILED DESCRIPTION OF THE PREFERRED EMBODIMENTS

Figure 5:
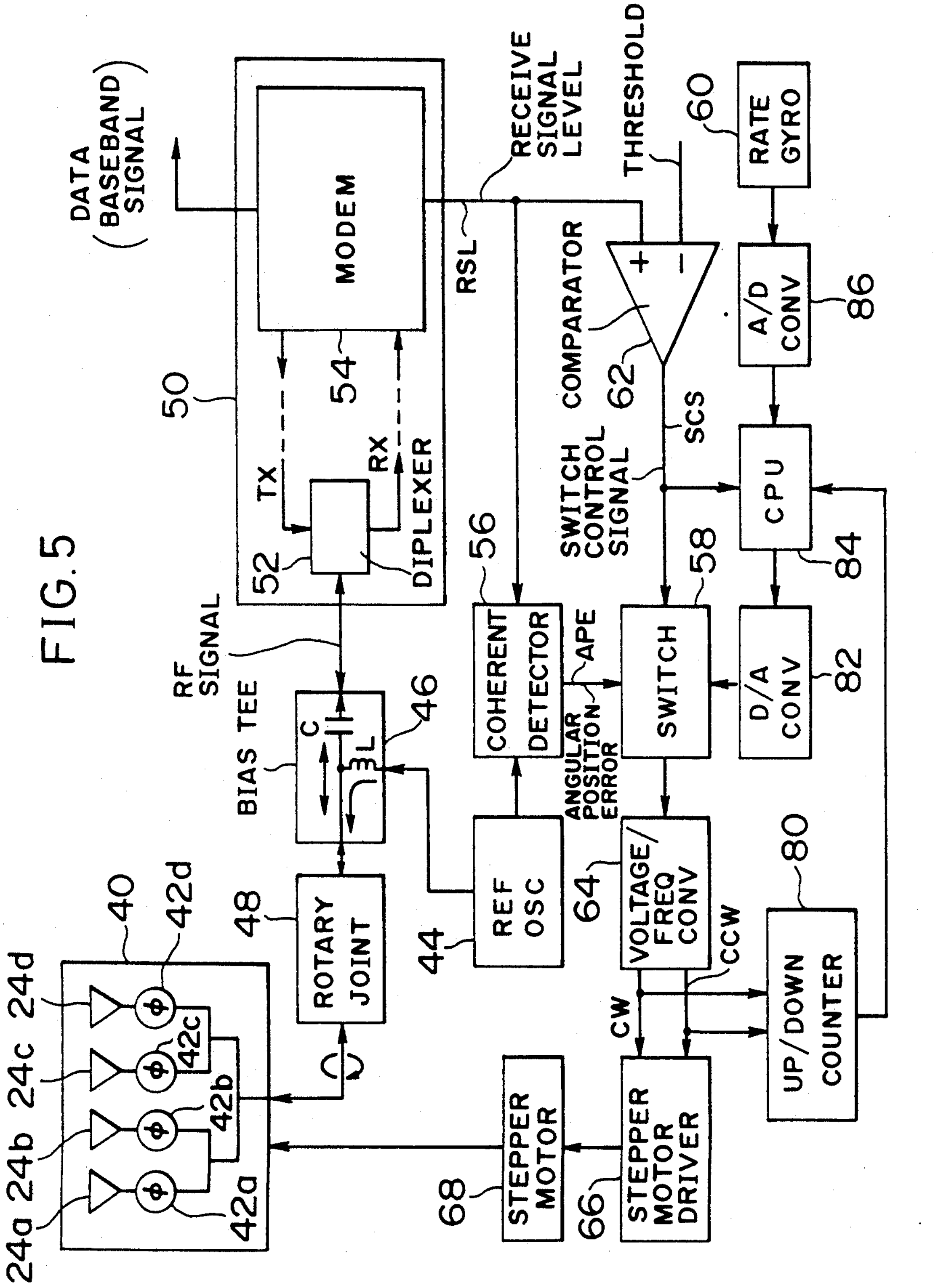
FIG. 5 is a block diagram showing an embodiment of the instant invention.

Reference is now made to FIG. 5, wherein there is shown an embodiment of the present invention.

Figure 1:
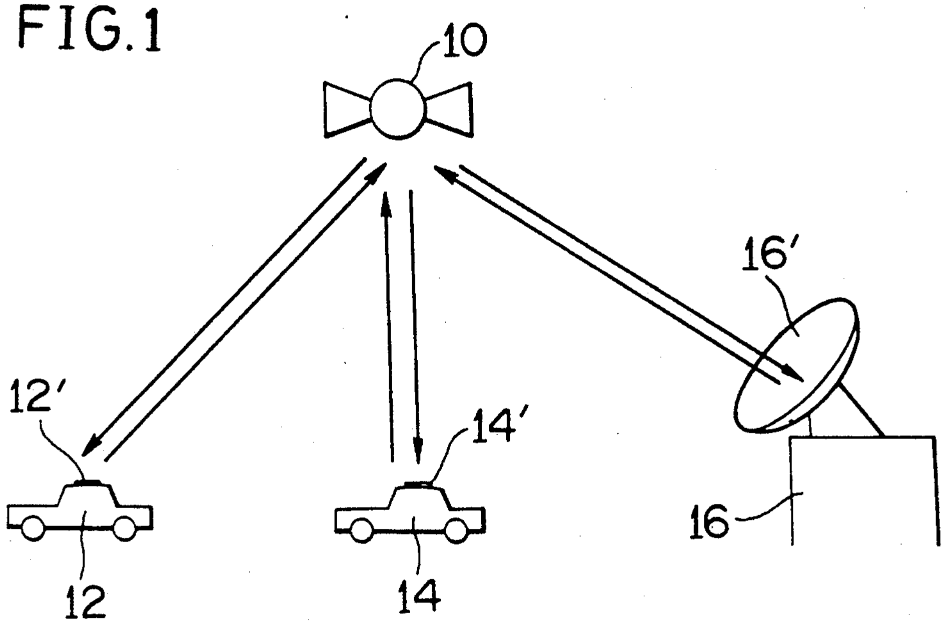
FIG. 1 is a sketch schematically illustrating a satellite land mobile communications system referred to in the opening paragraphs of the instant specification.
Figure 2:
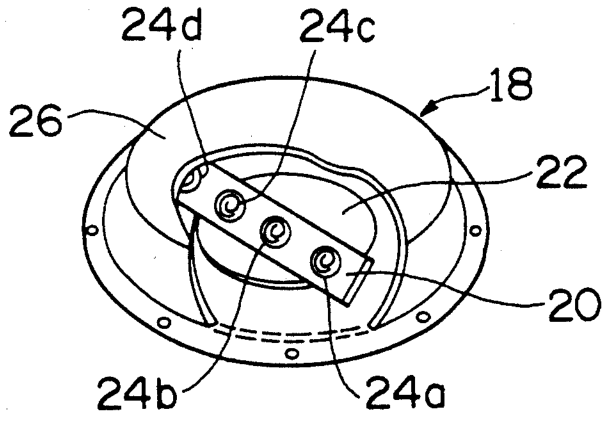
FIG. 2 is an illustration of a phased array type land mobile antenna system referred to in the opening paragraphs of the instant specification.
Figure 3:
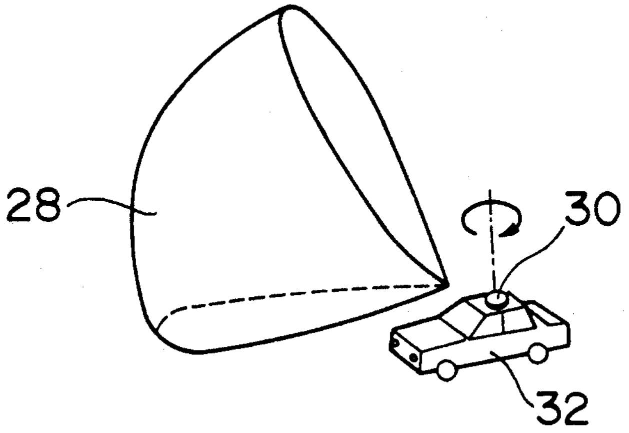
FIG. 3 shows schematically a fan beam formed by a phased array antenna, this drawing having been referred to in the opening paragraphs of the instant specification.
Figure 4:
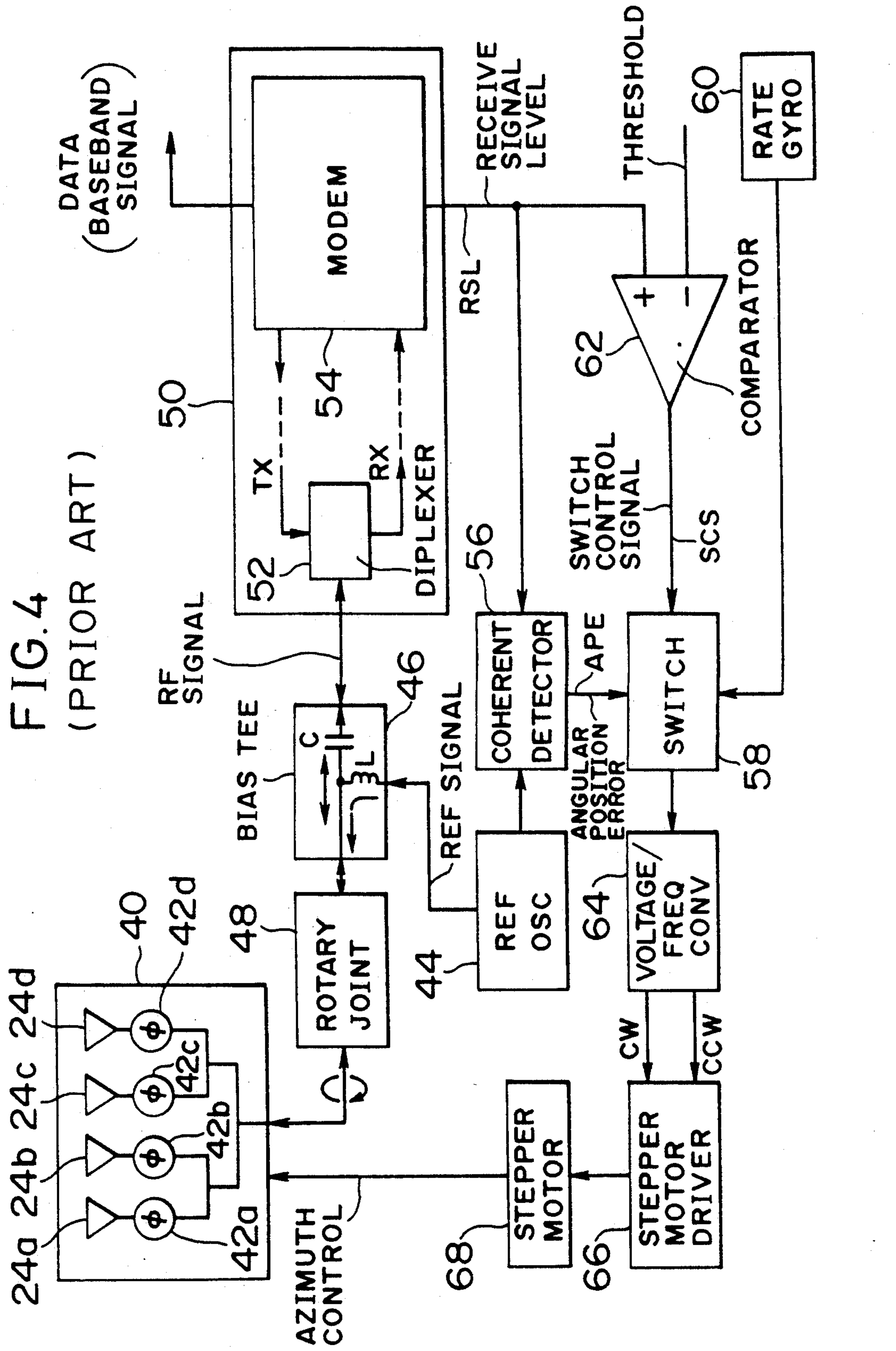
FIG. 4 (PRIOR ART)
FIG. 4 is a block diagram showing a known antenna beam orienting system referred to in the opening paragraphs of the instant specification.

The arrangement of FIG. 5 differs from that of FIG. 4 in that the former arrangement further includes an up/down counter 80, a D/A converter 82, a CPU (Central Processing Unit) 84 and an A/D converter 86, all of which are coupled as shown. The remaining portions of the FIG. 5 arrangement have been previously discussed and hence further description thereof will be omitted for the sake of brevity.

It is ideal that the angular velocity indicating voltage (denoted by R) derived by the rate gyro 60 always corresponds to the antenna angular velocity (denoted by V). However, it is practically unable to expect such an ideal situation. Accordingly, the angular velocity indicating voltage R should be compensated. Designating "A" and "B" by scale factor and an offset factor, respectively, of the rate gyro output then the following equation is obtained:

$$V_{deg/sec}=A_{deg/sec/volt}(R_{volt}-B_{volt})$$

The scale factor A converts an offset compensated rate gyro output voltage into the corresponding angular velocity. It should be noted that the factors A and B are initially set to predetermined values (Ao, Bo), respectively which are nominal values determined by the manufacturere of the rate gyro. In the case where the antenna mounted vehicle is in stoppage or driven straight, the angular velocity V equals zero and, accordingly, Bi=R (where Bi is a value of B). This means that the offset factor B is precisely determined while the vehicle is in stoppage or driven straight. The scale factor A is ascertained by V/(R−B). As a result, in the case where the automatic satellite tracking is unable or prevented, if the compensated value of A(R−B) is applied to the voltage/frequency converter 64 instead of the output of the coherent detector 56 (viz., V), the antenna beam pointing or orientation is precisely controlled.

Figure 6:
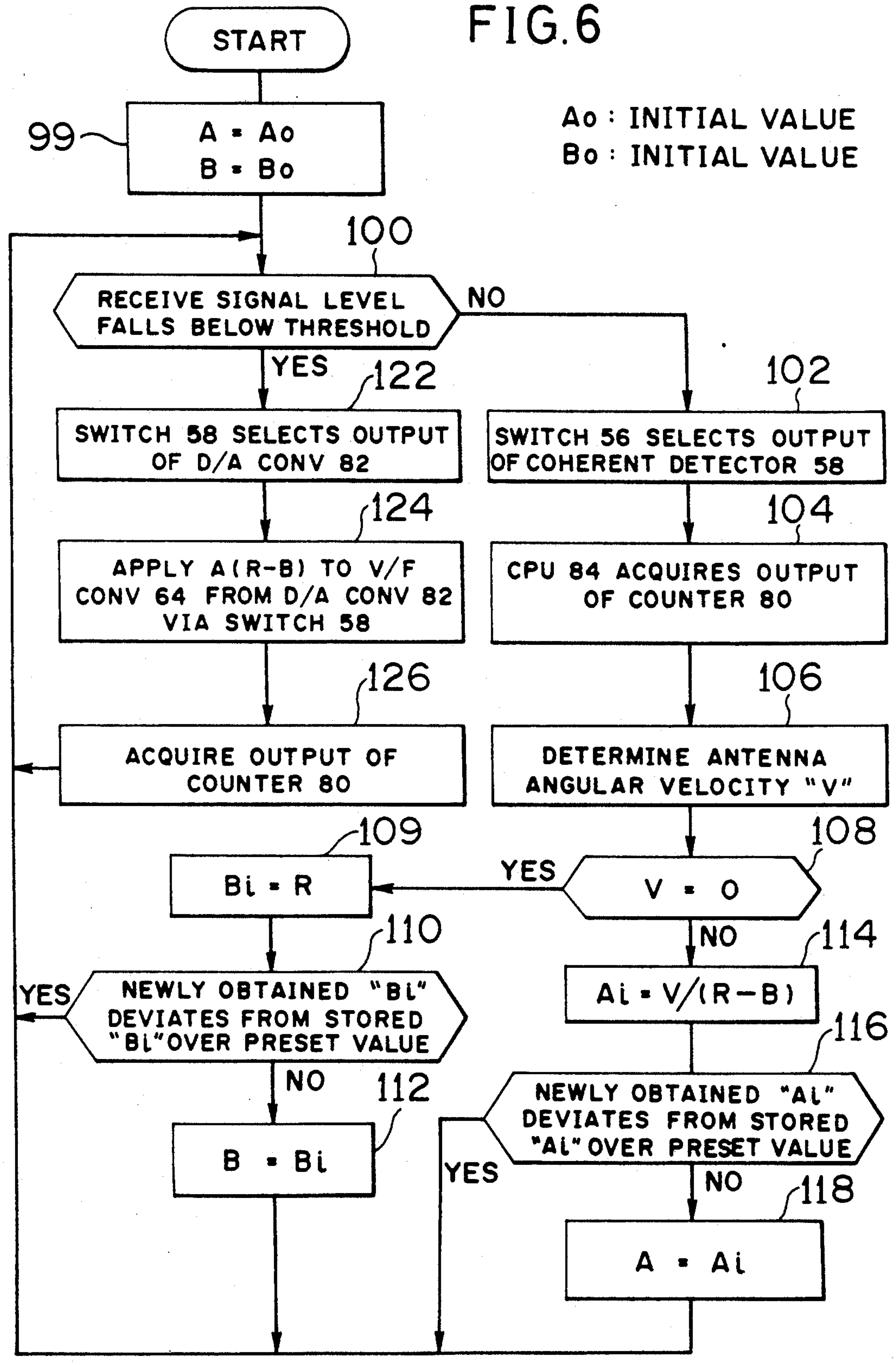
FIG. 6 is a flow chart for discussing the operation of the present invention.

The operation of the embodiment will further be discussed with reference to FIGS. 5 and 6.

The factors A, B are respectively set to predetermined initial values Ao, Bo at step 99. The receive signal level RSL is checked to see if it falls below the threshold at the comparator 62 (step 100). If the answer is not affirmative, the program goes to step 102 at which the switch 58 selects the output of the coherent detector 56. Following this, the CPU acquires the output of the up/down counter 80 at step 104. The CPU 84 calculates the antenna angular velocity V by determining the output change of the counter 80 per unit time period at step 106. At step 108, the antenna angular velocity V is checked to see if V=0. If the answer is affirmative, the offset value (denoted by Bi) is set to the angular velocity indicating voltage R derived from the rate gyro 60 (step 109), and then the flowchart goes to step 110 at which the offset value Bi acquired at step 109 is checked to see if it deviates from the presently stored Bi over a preset value (step 110). If the answer is affirmative, then the flowchart returns to step 100. Otherwise, the currently stored value Bi is replaced with the value Bi newly acquired at step 109 (step 112).

If the antenna angular velocity V is found not to be equal to zero at step 108, the scale factor (denoted by Ai) is obtained by calculating V/(R−B) at step 114. Following this, the flowchart checks to see if the scale factor Ai obtained at step 114 deviates from the currently stored A1 over a preset value at step 116. If the answer is affirmative, then the flowchart returns to step 100. Otherwise, the currently stored value Ai is replaced with the value Ai obtained at step 114 (step 118).

Further, if the receive signal level RSL does not reach the threshold (step 100), the switch 58 selects the output of the D/A converter 82 (step 122). Following this, the value of A(R−B) is calculated and applied to the voltage/frequency (V/F) converter 64 from the D/A converter 82 by way of the switch 58 (step 124). Then, the CPU 84 acquires the output of the voltage/frequency counter 80. This acquisition is for further compensation operation of the output of the rate gyro 60 in the event that the system returns to the automatic satellite tracking (step 126).

It is understood from the foregoing that according to the present invention, the output of the rate gyro 60 is constantly compensated for while the automatical satellite tracking is carried out. This means that the rate gyro 60 is no longer required a high precision as in the prior art and there is no need for expensive and cumbersome treatment of the rate gyro.

In the above discussion, the receive signal level RSL has been used for controlling the switch 58. However, it is within the scope of the present invention to use the output of a frame synchronizer (not shown in FIG. 5) included in the modem 54. That is to say, in the event that the frame synchronism is established, the output of the frame synchronizer is directly applied to the switch 58 for steering the output of the coherent detector 56. Contrarily, in the case where the frame synchronizer is out of synchronism, then the output of the D/A converter 82 is applied to the voltage/frequency converter 64 rather than the output of the coherent detector 56.

While the foregoing description described one embodiment of the present invention and one variant thereof, the various alternatives and modifications possible without departing from the scope of the present invention, which is limited only by the appended claims, will be apparent to those skilled in the art.

What is claimed is:

1. A method for tracking a satellite used in a land mobile satellite communications system, a rate gyro being used if an automatic satellite tracking is prevented, said method comprising the steps of:

(a) automatically tracking the satellite responsive to a receive signal level if the receive signal level equals or exceeds a threshold, said threshold indicating a signal level below which automatic satellite tracking cannot be carried out;

(b) compensating for first and second rate gyro output factors while automatically tracking the satellite, said first rate gyro output factor being a voltage offset factor by which a voltage offset of the rate gyro output is corrected, and said second rate gyro output factor being a scale factor for converting the rate gyro output into a rate gyro indicating an antenna angular velocity, said rate gyro being compensated in response to said first rate gyro output factor; and (c) tracking the satellite using the output of the rate gyro if the receive signal level falls below the threshold indicating that the automatic satellite tracking is unable.

2. A method as claimed in claim 1, where in step (b) includes the steps of:

(d) acquiring an output of a counter, the output of the counter indicating an antenna angular position;

(e) determining an antenna angular velocity in response to the output of the counter;

(f) changing a value of said first rate gyro output factor to be equal to the rate gyro output if the antenna angular velocity is detected zero; and (g) determining a value of said second rate gyro output factor in response to said antenna angular velocity, said rate gyro output and said first rate gyro output factor.

3. A method for tracking a satellite used in a land mobile satellite communications system, a rate gyro being used if an automatic satellite tracking is prevented, said method comprising the steps of:

(a) automatically tracking the satellite by using the receive signal level if the receive signal level equals or exceeds a threshold;

(b) acquiring an output of a counter while automatically tracking the satellite, the output of the counter indicating an antenna angular position;

(c) determining an antenna angular velocity by using the output of the counter obtained at step (b);

(d) setting a value of a first rate gyro output factor to be equal to the rate gyro output if the antenna angular velocity is detected zero, said first rate gyro output factor being a voltage offset factor by which a voltage offset of the rate gyro output is corrected; and (e) determining a value of a second rate gyro output factor using said antenna angular velocity, said rate gyro output and said first rate gyro output factor, said second rate gyro output factor being a scale factor for converting the rate gyro output, compensated for by said first rate gyro output factor, into a rate gyro indicating antenna angular velocity.

* * * * *